United States Patent
Nager (10) Patent No.: US 8,489,493 B2
(45) Date of Patent: Jul. 16, 2013

(54) METHOD AND ARRANGEMENT FOR CHANGING MARKET MODEL IN AN AUTOMATED EXCHANGE

(75) Inventor: Torbjörn Nager, Täby (SE)

(73) Assignee: OMX Technology AB, Stockholm (SE)

( * ) Notice: Subject to any disclaimer, the term of this patent is extended or adjusted under 35 U.S.C. 154(b) by 49 days.

(21) Appl. No.: 13/081,796

(22) Filed: Apr. 7, 2011

(65) Prior Publication Data

US 2012/0259757 A1    Oct. 11, 2012

(51) Int. Cl.
*G06Q 40/00* (2012.01)

(52) U.S. Cl.
USPC .......................................................... 705/37

(58) Field of Classification Search
USPC ..................................................... 705/36, 37
See application file for complete search history.

(56) References Cited

U.S. PATENT DOCUMENTS

| | | | | |
|---|---|---|---|---|
| 4,903,201 | A * | 2/1990 | Wagner | 705/37 |
| 7,835,972 | B2 * | 11/2010 | Almeida et al. | 705/37 |
| 2006/0106707 | A1 | 5/2006 | Shetty et al. | |
| 2007/0043647 | A1 * | 2/2007 | Bickford | 705/37 |
| 2007/0208657 | A1 * | 9/2007 | Petrino | 705/37 |
| 2008/0140557 | A1 | 6/2008 | Bowlby et al. | |
| 2012/0095898 | A1 * | 4/2012 | Kaminsky et al. | 705/37 |

FOREIGN PATENT DOCUMENTS

| | | |
|---|---|---|
| EP | 1 321 870 | 12/2001 |
| EP | 1724722 A1 | 11/2006 |
| WO | WO 2004/068311 | * 8/2004 |

OTHER PUBLICATIONS

Chen, C. C: A survey of the microstructure of block trading in European equity markets, May 2003, Institute di Finanza, Universita' della Svizzera Italiana, pp. 1-22.*
Reece, M.: TradeElect—Functionality, performance and capacity, 2008, London Stock Exchange, pp. 1-51.*
Callan, S: London exchange agrees to adopt trading changes, Oct. 4, 1996, Wall Street Journal, New York, p. A8.*
Schwartz et al.: Combining Quote-Driven and Order-Driven Trading Systems in Next Generation Stock Markets: A Experimental Investgation, 1997, IEEE, pp. 218-227.*
Schwartz et al., "Combining Quote-Driven and Order-Driven Trading Systems in Next-Generation Stock Markets: An Experimental Investigation", *Center for Digital Economy Research*, Jul. 1996, pp. 1-28.
International Search Report dated Oct. 5, 2012 in related international application No. PCT/SE2012/050326.

* cited by examiner

*Primary Examiner* — Bijendra K Shrestha
(74) *Attorney, Agent, or Firm* — Nixon & Vanderhye P.C.

(57) ABSTRACT

In an automated exchange comprising a matching module and a dissemination module a market model state is controlled in the matching module and in the dissemination module, respectively. Hereby it is made possible to, during ongoing trading, change market model for the automated exchange.

14 Claims, 5 Drawing Sheets

METHOD AND ARRANGEMENT FOR CHANGING MARKET MODEL IN AN AUTOMATED EXCHANGE

TECHNICAL FIELD

The invention relates to a method and an arrangement for trading in automated exchange, in particular it relates to a method, and an arrangement for changing market model state in an automated exchange.

BACKGROUND

When a seller and a buyer, i.e. trading participants, agree to a particular price for a financial instrument they complete a trade (i.e. complete a verbal, or electronic, transaction involving one party buying a financial instrument from another party). The trades are initiated and completed by the trading participants; such as individuals, firms, dealers (who may be either individuals or firms), traders and brokers. Trading of financial instruments is generally performed on an exchange, i.e. a trading venue and the trading is typically done through brokers, or traders, who buy or sell the financial instruments on behalf of investors. The term "financial instruments" is used herein in a broad sense and encompasses any tradable item i.e. securities, derivative or commodity, such as stocks, bonds, cash, swaps, futures, foreign exchange, options, gas electricity and so forth, or group of items that is traded through matching of counterparty orders (bid, offer).

There are a lot of various types of exchanges (i.e. marketplaces in which financial instruments are traded) for different financial instruments. Examples of such exchanges are 'open out-cry' exchanges, such as the New York Stock Exchange and automated electronic exchanges, such as the NASDAQ Stock exchange.

A conventional automated exchange typically receives order input data, in the form of data messages, from external devices used by the traders, or the brokers. The traders, or brokers, submit orders and/or quotes (or alterations/cancellations thereof) to the automated exchange for purposes of trading.

In this context, an order is a request to sell or buy a financial instrument from any trading participant of the automated exchange and a "quote" may be an "offer" price, a "bid" price, or a combination of both an "offer" and "bid" price of a financial instrument, and is determined from quotations made by market makers (or dealers). In this context, a market maker is defined as a company, or an individual, that quotes both a buy and a sell price in a financial instrument, or commodity held in inventory, hoping to make a profit on the bid-offer spread. Typically the market maker is a trading firm, registered with the exchange operator, to trade a predetermined amount of a desired financial instrument.

The orders/quotes may relate to buying and/or selling of any type of financial instrument. In particular, the input data to the automated exchange can be an order data message that represents the placing of a new bid or sell order, or a new quote. The order data message can also represent the change of an existing bid or sell order, or a quote. In addition, the order data message can represent a cancellation/change of an existing bid or sell order, or a quote.

Further, in trading of financial instruments, different types of market models are defined. Two well known market models are 'Order driven' markets and 'Quote driven' markets. The difference between the two market models is what type of orders/quotes that are accepted by the exchange and also what is displayed in the market, in terms of orders and bid and ask prices.

The order driven market displays all of the bids and asks, while the quote driven market focuses only on displaying the bids and asks that are submitted by the market makers; i.e. the quotes. Also, in a quote driven market, one side of a matched trade typically includes a quote by a market maker. As a result, orders are typically not allowed to rest, i.e. be stored, in an order book in a quote driven market. On the other hand, in an order driven market, all of the orders of both buyers and sellers are displayed, detailing the price at which the buyers and sellers are willing to buy, or sell, a financial instrument and also the amount of the financial instrument that the buyers and sellers are willing to buy or sell at that price. Thus, in an order driven market, all orders are continuously matched and all types of orders can be entered, but no quotes can be entered. Further, in the order driven market, the price dissemination is sent, or broadcasted, based on the traded orders and the orders resting, i.e. being stored, in the order book.

An advantage provided by the order driven market is that it is transparent in that the order driven market shows all of the orders and at what prices trading participants are willing to buy or sell.

A drawback is that, in the order driven market, there is no guarantee of order execution. However, in the quote driven market, there is an order execution guarantee present, provided that the buy and sell prices match.

In the quote driven market, even though individual orders are not seen, the market maker will either fill an entered order from its own inventory, or match the order with another order. Thus, in the quote driven market, all orders are continuously matched with a quote. All quotes can be entered and allowed to rest, i.e. being stored, in the order book, but only orders that can be matched instantly may be entered. That is, no orders can rest in the order book. Further, in the quote driven market, the price dissemination is sent, or broadcasted, based on the quotes in the order book.

A major advantage of the quote driven market is the liquidity it presents. This, as the market makers are required to meet their quoted prices, either buying or selling. A major drawback of the quote driven market is that, unlike the order driven market, it does not show the transparency in the market (i.e. individual orders are not visible in this market model).

Further, there are markets that combine attributes from the two systems, to form so called hybrid markets. For example, a hybrid market may show the current bid and ask prices of the market makers, but also allow orders to stay in the order book and allow trading participants to view all of the orders stored in the orderbook.

Figure 1:
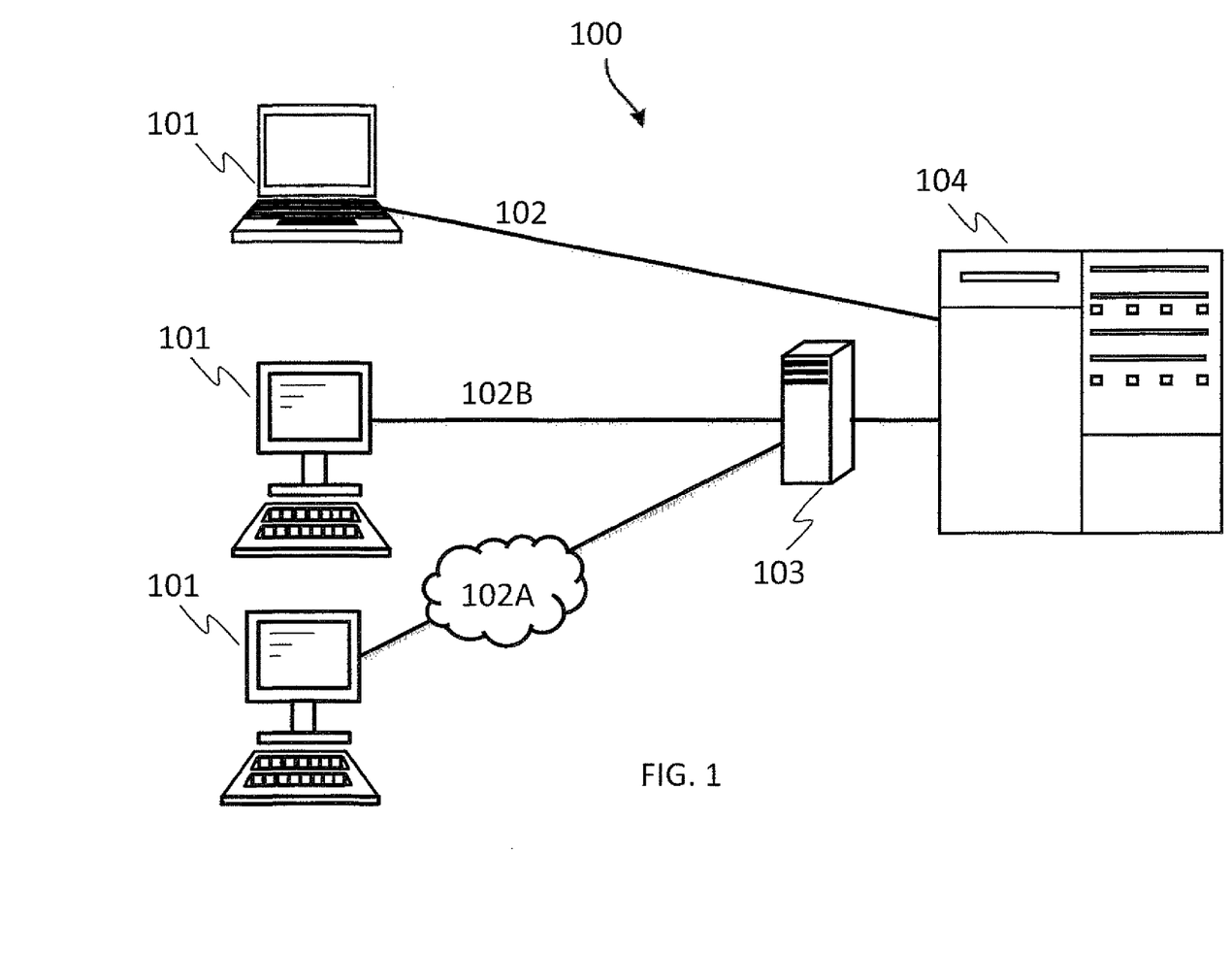
FIG. 1 illustrates an automated exchange for automated electronic trading of financial instruments.

FIG. 1 illustrates a conventional automated exchange system 100 comprising trader terminals 101 that are used for issuing order data messages, i.e. input data received by the automated exchange 104. The trader terminals 101 are connectable, for example over the internet 102A, or over some other connection means like a dedicated fiber 102B, to an electronic marketplace, i.e. an automated exchange 104. The automated exchange 104 can be hosted on a computer server. Sometimes the trader terminals 101 are connected to the automated exchange 104 through an entry gateway 103 connected to or being a part of the automated exchange 104 and configured to receive market actions from the trader terminals 101. An entry gateway 103 is usually in connection with the automated exchange 104 on a dedicated network and forwards the market actions to the automated exchange 104 and further usually broadcast updates, back to the trader terminals 101. It should be understood that information being communicated to and from the automated exchange 104 and the trader terminals 101 could be communicated via a single communication path.

While the trading terminals 101 in FIG. 1 are illustrated as trading terminals that traditionally are associated with manual input of market actions, the trading terminals 101 can also be implemented as an algorithmic trading unit, sometimes termed automatic order generator, with manual input means for control of the algorithmic trading unit. The algorithmic trading unit is pre-programmed with instructions to automatically generate sell and buy orders and quotes (or changes/cancellations thereof) in response to input data received from the automated exchange 104. The trading terminals 101 also represent market makers inputting quotes to the automated exchange 104.

The trader terminals 101 also receive data back from the automated exchange 104. Typically, the received data is market data such as prices and volumes in different financial instruments, produced by the automated exchange 104 or received from some other source of information. The market data contains information that characterizes the various tradable financial instruments, including among other parameters, order related parameters, such as price and quantity and the inside market, which represents the lowest sell price (also referred to as the best or lowest ask price) and the highest buy price (also referred to as the best or highest bid price). In some electronic markets, the market data may also include market depth (or a part thereof), which generally refers to quantities available for trading the tradable financial instruments at certain buy price levels and quantities available for trading the tradable financial instrument at certain sell price levels.

Conventional automated exchange systems 100, as described above, are designed to operate in accordance with some predefined market model. Depending on which market model the automated exchange system 100 is designed to operate in accordance with, the automated exchange system 100 will be associated with the advantages and the drawbacks associated with that specific market model. There is, due to today's frenetic markets, a constant need and desire to improve upon existing automated exchange systems 100 and to provide solutions that operate with fewer drawbacks than pre-existing automated exchange systems 100. Hence, there is a need for an improved automated exchange 104.

SUMMARY

It is an object of embodiments of the invention to provide an improved automated exchange 104 and a method of operating an automated exchange.

This object is addressed by the present invention as set out in the appended independent claims. Advantageous embodiments are recited in the appended dependent claims.

Thus an automated exchange in accordance with embodiments of the invention comprises a matching module adapted to match bids and offers, received via an external interface, the matching module being operatively coupled to, a memory adapted to store an order book, wherein received bids and offers, allowed to be stored, are stored if not matched by the matching module. The automated exchange further comprises a dissemination module adapted to disseminate market data via an external interface. The automated exchange also comprises controller circuitry adapted to control a market model state in the matching module and in the dissemination module, respectively. Hereby it is made possible to, during ongoing trading, change market model for the automated exchange.

In accordance with one example embodiment the controller circuitry is adapted to control the market model state by providing control parameters to the matching module and the dissemination module, respectively. Hereby it is made possible to control, in real time, the behavior of the matching module and the dissemination module.

In accordance with one embodiment the controller circuitry is adapted to determine the market model in response to an external input signal. The external input signal is in one example embodiment a timer signal or a manual control signal. Hereby, external control over the market model can be exercised without having to interrupt trading.

In accordance with one embodiment the controller circuitry is adapted to determine the market model in response to an internal trigger event. The internal trigger event is in one example embodiment that the trading activity being above or below a pre-determined threshold. Hereby the need for external control is reduced or eliminated.

In accordance with one embodiment the controller circuitry is adapted to determine the market model individually for a financial instrument traded in the automated exchange. Hereby it is made possible to, in real time, configure the market model for each financial instrument traded on the automated exchange to be the market best suited for a particular financial instrument at a particular time.

In accordance with one embodiment the controller circuitry is adapted to setting the market model state to one, of the following market models: order driven market, quote driven market, and hybrid market.

Thus a method of operating an automated exchange in accordance with embodiments of the invention comprises matching bids and offers received via an external interface by a matching module. The method further comprises storing received bids and offers not matched by the matching module by a memory circuitry and disseminating market data by a dissemination module. The method further comprises controlling, by a session handling module, a market model state in the matching module and in the dissemination module, respectively.

In accordance with one example embodiment the market model state is controlled by providing control parameters to the matching module and the dissemination module, respectively.

In accordance with one example embodiment the market model state is determined in response to an external input signal.

In accordance with one example embodiment the external input signal is a timer signal or a manual control signal.

In accordance with one example embodiment the market model state is determined in response to an internal trigger event.

In accordance with one example embodiment the triggering event is trading activity being above or below a pre-determined threshold.

In accordance with one example embodiment the market model state is determined individually for a financial instrument traded in the automated exchange.

In accordance with one example embodiment the market model state is set to one of the following market models: order driven market, quote driven market, and hybrid market.

BRIEF DESCRIPTION OF THE DRAWINGS

The invention will now be described in more detail, by non-limiting examples and with reference to the accompanying drawings, in which.

DETAILED DESCRIPTION

Figure 2:
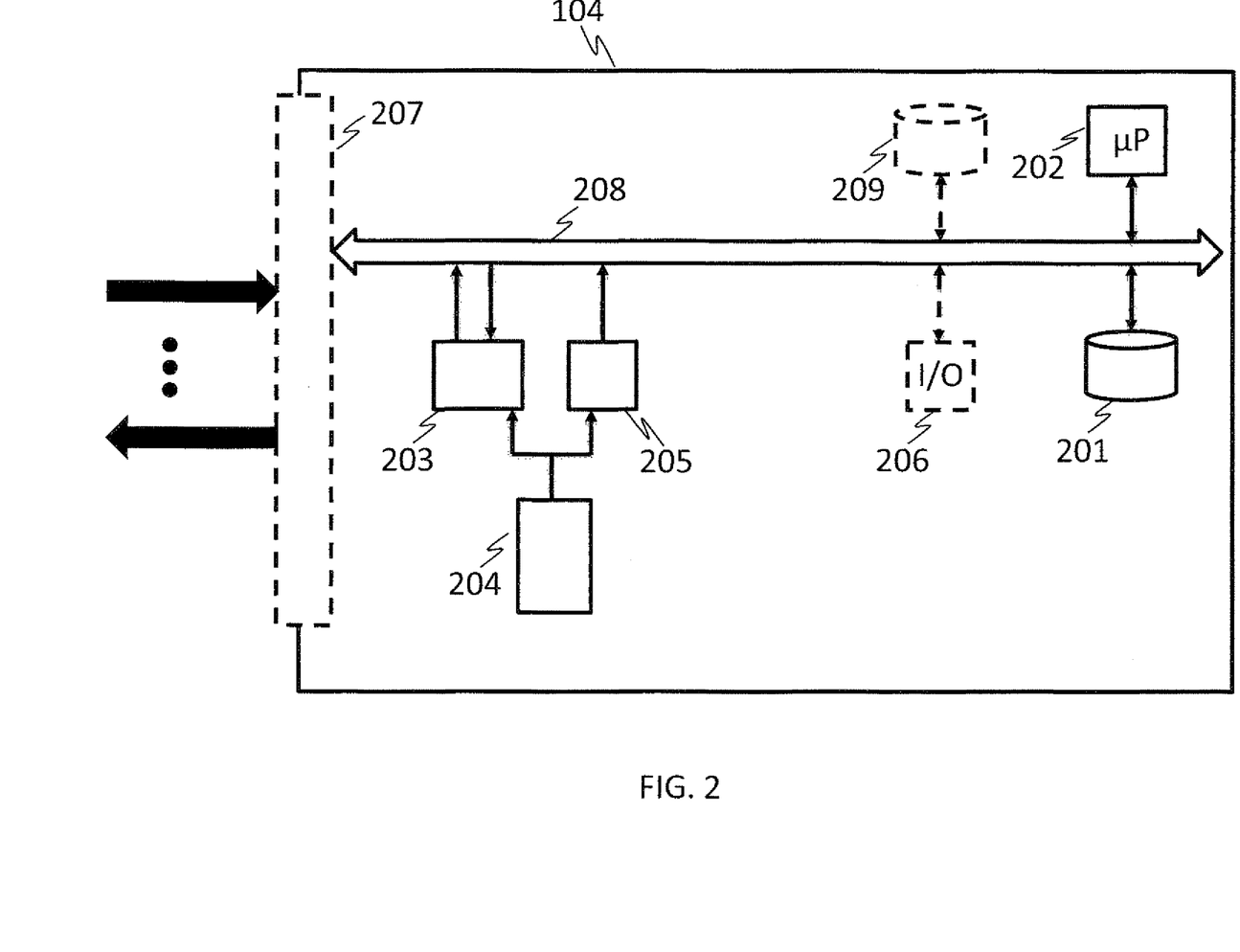
FIG. 2 illustrates a block diagram of an embodiment for an automated exchange.

In the following description, for purposes of explanation and not limitation, specific details are set forth such as particular architectures, interfaces, techniques, etc. in order to provide a thorough understanding of the present invention.

to FIG. 2 illustrates an embodiment depicting an automated exchange 104, implemented on a computer and comprising a memory 201, a processing logic 202, a matching module 203 and an information dissemination module 205, all coupled by a bus 208. The automated exchange 104 further comprises a session handling module 204 operatively coupled to both the matching module 203 and the information dissemination module 205. The processing 202 logic may include a processor, microprocessor, an ASIC, FPGA, or the like.

Figure 3:
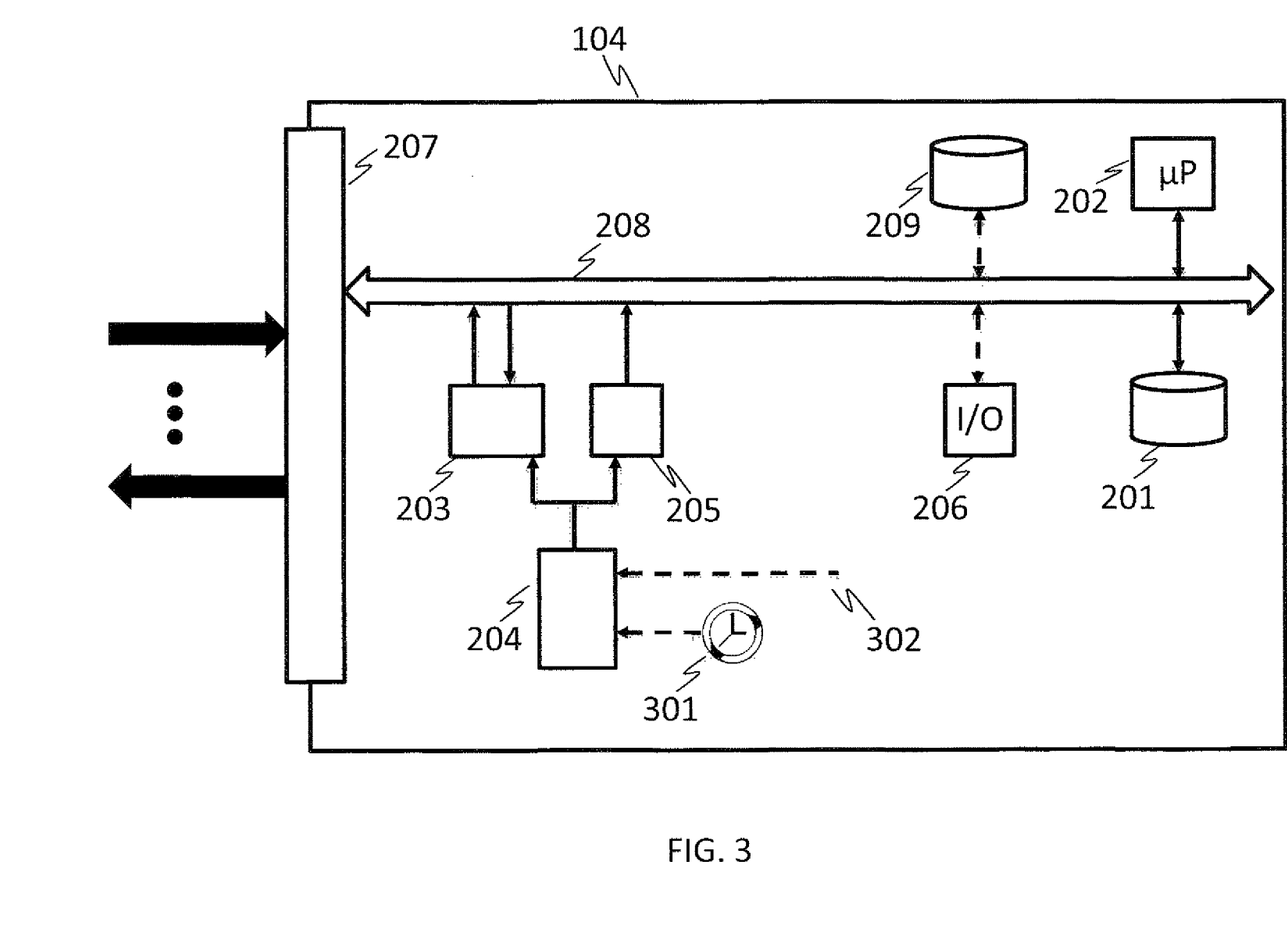
FIG. 3 illustrates a computer implementing some embodiments of an automated exchange

FIG. 3 illustrates a computer implementing some embodiments of the automated exchange 104. The automated exchange 104 comprises the memory (typically a random access memory (RAM)) 201, the programmable processor 202, the matching module 203, a storage memory (e.g. a hard drive) 209 and an input/output (I/O) controller 206, all coupled by the bus 208. The memory 201 is arranged to store different data for the automated exchange 104. In particular the memory 201 stores an order book comprising matchable sell/buy orders and quotes, which have not been matched by the matching module 203. While, in FIG.2, only one processor 202 and one memory 201 are shown, it is understood that the automated exchange 104 in some embodiments is configured with several processors and or memories interconnected according to normal practices in the field of computer science, but for sake of clarity only one of each is shown. In some embodiments the automated exchange 104 is implemented on a server type computer and in some embodiments the automated exchange 104 is included in a cluster of such server type computers. The storage memory 205 is adapted to store executable computer programs.

In some embodiments the automated exchange 104 comprises a server system including one or more processors that are configured to work as central automated exchange 104 for matching of financial instruments.

The automated exchange 104 is, through an external interface 207, connectable to a network, not illustrated in FIG. 2. The external interface 207 is a device capable of sending/receiving traffic. The network comprises conventional network means, as well as front end applications. Examples of such front end applications are trading systems (not illustrated) and trading terminals 101 that are used by participants of the automated exchange 104 for submitting market actions (i.e. input data messages comprising new, altered or cancelled orders and or quotes) to the automated exchange 104.

In some embodiments the modules and interfaces comprise both hardware and software components. Further, in some embodiments the matching module 203 comprises a computer program, or part of a computer program stored at a memory allocation 201, 205 and a processor 202 that accesses the computer program, such that the processor 202 performs the methods according to the embodiments described herein. Yet further, in some embodiments the processor 202 is of standard type; and in some embodiments the processor is a multi-core processor.

Figure 4:
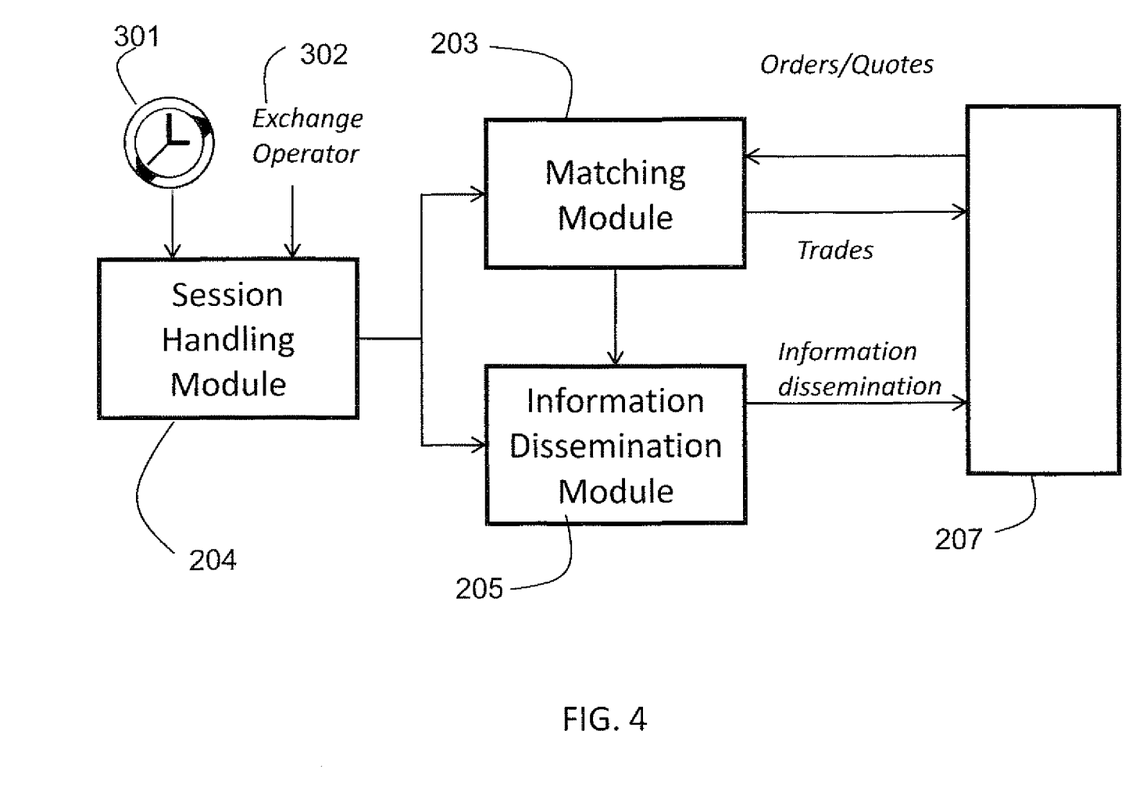
FIG. 4 illustrates different components of an automated exchange.

In accordance with embodiments described herein, the matching module 203 is configured as depicted in FIG. 4. The matching module 203 is adapted to perform matching of quotes and orders received via the external interface 207. In addition to receiving orders and quotes via the external interface 207 input signals are received from the session handling module 204 being adapted for session handling. The sessions referred to are the market model state sessions. As described above in conjunction with FIG. 2, the matching module 203 is connected to a memory 201 that is adapted to storing an order book, where unmatched orders and quotes are stored (if the order is of a type that permits storing). The matching module 203 is further connected to an information-, or data dissemination module 205. In some embodiments the information dissemination module 205 receives raw order book information from the matching module 203 and further being configured to create broadcast messages, including the prices at which a particular financial instrument is traded and also be configured to include data indicating the volume of orders at other prices than the price latest traded and also other information.

In some embodiments a controller circuitry of the session handling module 204 is configured to control scheduling of trading sessions, wherein a trading session is a period of time such a trading day or a part of a trading day. The controller circuitry of the session handling module 204 is then further configured to control switching between trading session states based on the scheduling. The scheduling can be based on a pre-determined schedule as represented by the clock 301 or by a manual switch 302 that in some embodiments is controlled by the exchange operator. In accordance with some embodiments the scheduling is also based on trading activity received from the matching module 203. As depicted in FIG. 3 the session handling module 204 is connected to the matching module 203 and the information dissemination module 205. The state as determined in the session handling module 204 can thereby be conveyed to the other modules 203 and 205. As a result the modules 203 and 205 are configured to act in accordance with a current state of the session handling module 204.

As set out above, in some embodiments, the controller circuitry of the session handling module 204 is configured to control the currently defined market model. For example, the automated exchange 104 can be configured to handle a number of different market models, such as order driven market, quote driven market and hybrid market. By letting the market model be defined in a session handling module 204 connected to the matching module 203 and the price dissemination module 205, the market model can be switched, in real time, in response to the input to the session handling module 204. The market model can also be determined autonomously in the session handling module 204 based on input data from for example the matching module 203.

This ability to, during on-going trading, switch market model provides numerous advantages, compared to pre-existing automated exchanges. For example, it will be possible to configure a trading session where the market starts up (typically in the beginning of the day) as a quote driven market and then, after a given time, the market model is switched into an order driven market upon some triggering event. In one embodiment, the operator of the automated exchange 104 decides, during ongoing trading, that another market model should be applied. The operator then submits input data to the session handling module 204 to that effect. The session handling module 204 will then switch state accordingly and transmit information about this change of market model to the matching module 201 and the information dissemination module 205. Similarly, in some embodiments, the session handling module 204 is configured to automatically switch market model, based on another external input. In one embodiment this is a clock signal 301 which triggers the change of market model state during ongoing trading. In some embodiments the trading activity in the market or the trading activity in a particular financial instrument, is used to trigger a change of the market model. In accordance with some embodiments the market model is changed individually for a particular financial instrument traded in the automated exchange In particular, each financial instrument is traded using a determined market model that is determined to be best for that financial instrument at a particular time. In accordance with other embodiments the market model is changed collectively for a group of financial instruments.

To exemplify further, when the trading is slow in a particular financial instrument and the number of trades per time unit is below a threshold value a state, set in accordance with a first market model, is used for that financial instrument. In some embodiments the first market model corresponds to a quote driven market. In some embodiments on the other hand, when the trading is fast in a particular financial instrument and the number of trades per time unit is above a threshold value (which can be the same threshold value used to determine that the trading is slow), a state set in accordance with a second market model is used for that financial instrument. In some embodiments the second market model corresponds to an order driven market. The state can, of course, be set in response to multiple input parameters, such as a combination of trading activity and a clock signal. For example, in some embodiments the threshold value, used to determine when trading is slow or fast, is variable in response to the time given by the clock signal.

In some embodiments, the switching of market models is executed by transmitting control parameters from the session handling module 203 to the matching module 201 and the information dissemination module 205. As an example, in the example embodiment depicted in FIG. 4, the parameters transmitted areas follows:

a first set of parameters, here termed matching parameters, are transmitted to the matching module 201 to control how orders/quotes are allowed to match. In particular, the parameters are set to correspond to a particular market model to be used. In some embodiments the parameters are also set to configuring how resting (i.e. stored) orders in the order book 201 are allowed to match. For example, the parameters can be set to determine if the matching module 203 should match or reject a new resting order that matches or crosses with an existing resting order in the order book.

a second set of parameters, here termed dissemination parameters, are transmitted to the information dissemination module 205 to control what information to disseminate via the external interface 207. In particular, the parameters are set to correspond to the particular market model currently being used by the automated exchange system. Hereby, the information dissemination module 205 is configured to disseminate the information typically disseminated in accordance with a particular market.

Figure 5:
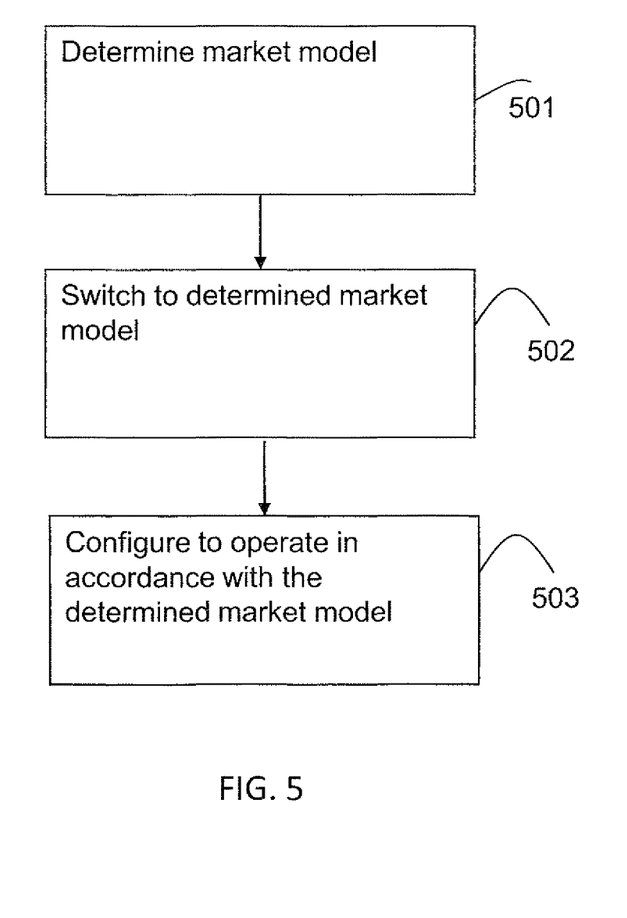
FIG. 5 illustrates a flow diagram depicting some procedural steps performed in an automated exchange.

In FIG. 5 a flowchart illustrating some procedural steps performed when switching market model in an automated exchange 104 is shown. First, in a step 501, the automated exchange 104 determines what market model should be used. The determination in step 501 can be made continuously, or at least periodically, during an ongoing trading session, where a trading session typically corresponds to a day or a part of a day. Then, in a step 502, automated exchange 104 switches to the determined market model. Next in a step 503 the matching module 203 and the information dissemination module 205 are configured to operate in accordance with the determined market model. In particular, the matching module 203 and the information dissemination module 205 are provided with configuration parameters for configuring the matching module 203 and the information dissemination module 205 to operate according to the determined market module. In accordance with one embodiment the information dissemination model 205 is further configured to inform the market, via the external interface 207 when a change of market model has been made. While the external interface 207 to which the dissemination module 205 is connected is here shown as being the same external interface as the external interface used for receiving orders, it is understood that the interfaces for receiving orders and disseminating data can be configured as to separate entities.

Using the methods and systems as described herein it will be possible to, in real-time, change the market model used by an automated exchange system. This, in turn, will improve the efficiency within the automated exchange system in that the market model applied can be the market model, currently determined to best correspond to the need in the market.

The invention claimed is:

1. An automated exchange comprising one or more processors:
   - a matching module executable by the one or more processors to match bids and offers, received via an external interface, the matching processor being operatively coupled to a memory configured to store an order book and configured to store the received bids and offers if not matched by the matching processor,
   - a dissemination module executable by the one or more processors to disseminate market data via an external interface; and
   - a session handling module executable by the one or more processors to:
   - set a market model state in the matching module and in the dissemination module to one of the following market models: an order-driven market, a quote-driven market, or a hybrid market, and
   - intraday change, during ongoing trading, the set market model for a particular financial instrument traded on the automated exchange to be the market model best suited for the particular financial instrument at a particular time.

2. The automated exchange according to claim 1, wherein the session handling module is executable by the one or more processors to control the market model state by providing control parameters to the matching module and the dissemination module, respectively.

3. The automated exchange according to claim 1, wherein the session handling module is executable by the one or more processors to determine the market model in response to an external input signal.

4. The automated exchange according to claim 3, wherein the external input signal is a timer signal or a manual control signal.

5. The automated exchange according to claim 1, wherein the session handling module is executable by the one or more processors to determine the market model in response to an internal trigger event.

6. The automated exchange according to claim 5, wherein the triggering event is trading activity being above or below a pre-determined threshold.

7. The automated exchange according to claim 1, wherein the session handling module is executable by the one or more processors to determine the market model individually for a financial instrument traded in the automated exchange.

8. A method in automated exchange having one or more processors, the method comprising:
- matching, by a matching module executed by the one or more processors, bids and offers received via an external interface,
- storing in a memory received bids and offers not matched by the matching module executed by the one or more processors,
- disseminating market data by a dissemination module executed by the one or more processors; and
- controlling, by a session handling module executed by the one or more processors, a market model state in the matching module and in the dissemination module to a selected one of the following market models: an order-driven market, a quote-driven market, or a hybrid market, and
- intraday changing, during ongoing trading, by the session handling module executed by the one or more processors, the selected market model for a particular financial instrument traded on the automated exchange to be the market model best suited for the particular financial instrument at a particular time.

9. The method according to claim 8, wherein the market model state is controlled by providing control parameters to the matching module executed by the one or more processors and the dissemination module executed by the one or more processors, respectively.

10. The method according to claim 8, wherein the market model state is determined in response to an external input signal.

11. The method according to claim 10, wherein the external input signal is a timer signal or a manual control signal.

12. The method according to claim 8, wherein the market model state is determined in response to an internal trigger event.

13. The method according to claim 12, wherein the triggering event is trading activity being above or below a pre-determined threshold.

14. The method according to claim 8, wherein the market model state is determined individually for a financial instrument traded in the automated exchange.

* * * * *